United States Patent
Wlodarczyk et al.

[11] Patent Number: 6,131,465
[45] Date of Patent: Oct. 17, 2000

[54] FIBER OPTIC COMBUSTION PRESSURE SENSORS FOR ENGINE KNOCK AND MISFIRE DETECTION

[76] Inventors: Marek T. Wlodarczyk, 6865 Vachon Dr., Bloomfield Hills, Mich. 48301; Jerzy A Kabala, ul. Galenowa 2/13, Kielce 25-705, Poland; Andrzej Mendak, ul. Hoza 17A/24, Kielce 25-612, Poland

[21] Appl. No.: 09/155,825

[22] PCT Filed: Apr. 3, 1996

[86] PCT No.: PCT/US96/04637

§ 371 Date: Mar. 17, 1999

§ 102(e) Date: Mar. 17, 1999

[87] PCT Pub. No.: WO97/31251

PCT Pub. Date: Aug. 28, 1997

Related U.S. Application Data

[63] Continuation-in-part of application No. 08/390,970, Feb. 21, 1995, and a continuation-in-part of application No. 08/392,315, Feb. 22, 1995, which is a continuation-in-part of application No. 08/086,245, Jul. 7, 1993, Pat. No. 5,390,546.

[51] Int. Cl.$^7$ .................................................. G01L 7/08
[52] U.S. Cl. ........................... 73/715; 73/35.01; 73/35.07
[58] Field of Search .......................... 73/35.07, 35.01, 73/35, 35.02

[56] References Cited

U.S. PATENT DOCUMENTS

| 5,390,546 | 2/1995 | Wlodarczyk | 73/715 |
| 5,438,873 | 8/1995 | Wlodarczyk et al. | 73/705 |
| 5,600,070 | 2/1997 | Wlodarczyk | 73/715 |

*Primary Examiner*—Harshad Patel
*Assistant Examiner*—Maurice Stevens
*Attorney, Agent, or Firm*—James M. Deimen

[57] ABSTRACT

Spark plug (20) integrated fiber optic combustion pressure sensors (30, 36) are configured to decrease heat and fatigue damage to the critical diaphragm (40) and fiber tip (37). A cup-shaped diaphragm (40) having non-uniform thickness reduces stress on the diaphragm and increases the reliability of the sensor. The effects of overpressure on the sensor are reduced by providing an angled portion (42) on the ferrule.

26 Claims, 13 Drawing Sheets

FIG 21             FIG 22
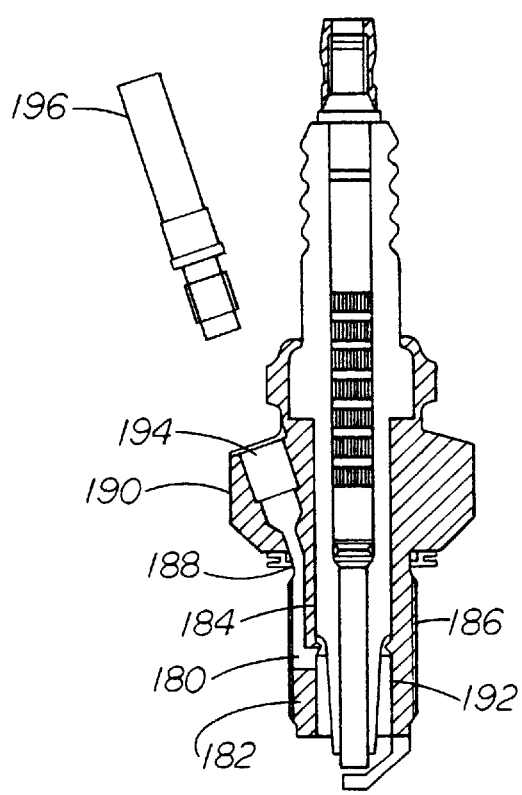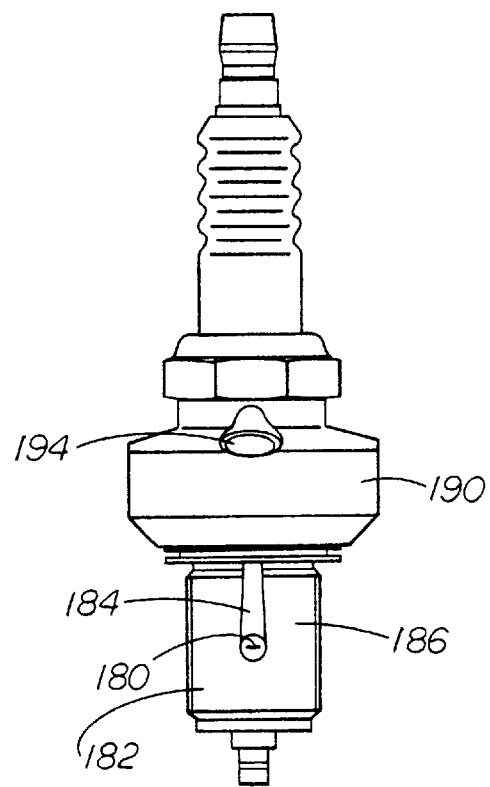

FIG 28
FIG 29
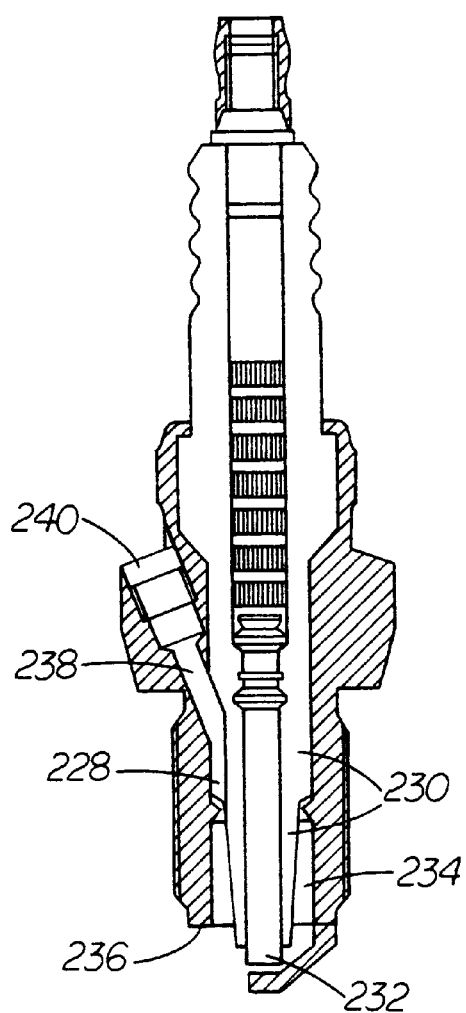
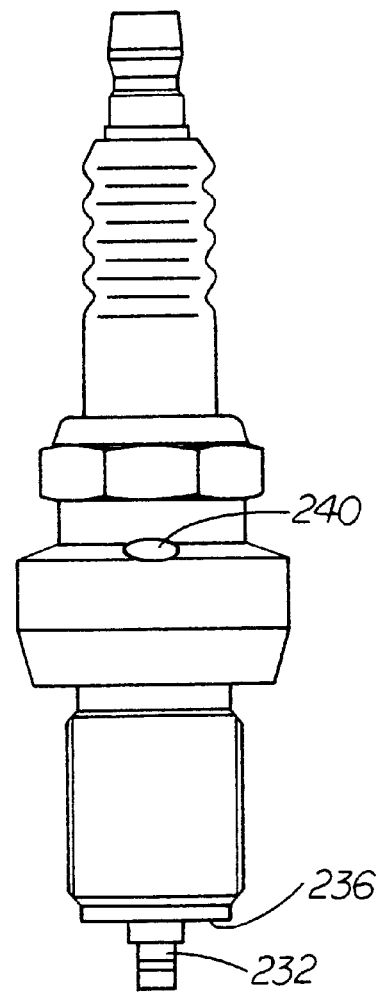

FIBER OPTIC COMBUSTION PRESSURE SENSORS FOR ENGINE KNOCK AND MISFIRE DETECTION

CROSS REFERENCE TO RELATED APPLICATION

This application is a continuation-in-part of application Ser. No. 08/390,970, filed Feb. 21, 1995, and application Ser. No. 08/392,315, filed Feb. 22, 1995, in turn continuations-in-part of application Ser. No. 08/086,245, filed Jul. 7, 1993, now U.S. Pat. No. 5,390,546. In addition co-pending application Ser. No. 08/442,218, filed May 16, 1995, is incorporated herein by reference for its disclosure of auto-referencing and sensor health monitoring disclosures particularly applicable to the sensors of the instant application.

BACKGROUND OF THE INVENTION

The field of the invention pertains to fiber optic sensors instantaneously sensitive to pressure or stress in a manner that causes a beam of light to be reflectively modulated in response to changes in pressure or stress on the sensor.

In particular, in the automotive field, the ability to continuously monitor internal combustion engines for pressure fluctuations can significantly improve engine efficiency, performance, reliability and operating costs. Most importantly, the level of emissions can be reduced over the 100,000 mile effective life of the engine emissions control systems to be required by the United States Environmental Protection Agency. In addition, open and closed loop controls based on pressure information permit lean-burn engine operation, a wider tolerance to fuel octane and acceptance of alternative fuels.

Two combustion parameters, engine knock and misfire, have a particularly significant effect on overall engine performance. Combustion knock causes increased fuel consumption, reduced engine torque and engine deterioration if left uncorrected. Eventually severe damage such as perforated pistons can occur.

Misfire can result in catalyst damage and degradation that eventually cause vehicle exhaust emissions to no longer meet current or proposed emission standards. With a design 100,000 mile catalyst life, the failure to detect and correct misfire could result in operation of the vehicle for a lengthy period of time, possibly many years, with an ineffective catalyst.

The California Air Resources Board has recently proposed regulations which will require vehicles to be equipped with on-board emission monitoring systems. Such systems, in particular, will require misfire monitoring. The Environmental Protection Agency is also considering regulations to require such monitoring systems.

A low cost, reliable cylinder-selective combustion pressure sensor would permit knock and misfire detection separately for each cylinder. In addition to signalling the malfunction to the vehicle operator, a real time solid state engine control could adjust specific cylinder parameters to correct for the malfunction. The majority of the presently available or proposed knock and misfire detection techniques provide information that is not cylinder specific and therefore has limited utility for real time corrective controls. However, some recent patents disclose cylinder specific sensors. These sensors generally fall into two categories, luminosity detectors and pressure detectors.

U.S. Pat. No. 4,919,099 discloses a probe insertable into the engine cylinder combustion chamber. The probe includes a light conductive rod and fiber optic transmission bundle connected to an opto-electronic detector for instantaneous detection of the luminosity of the combustion gases within the combustion chamber. U.S. Pat. No. 5,052,214, in a similar manner, utilizes a fiber optic probe and transmission cable to sense and transmit the instantaneous luminosity to an opto-electronic detector. International Application Publication WO 89/11031 and European Application Publication EP-392-650-A also disclose optical luminosity probes for engine combustion chambers.

U.S. Pat. No. 4,781,059 discloses an optical fiber pressure sensor comprising a plurality of fibers to transmit light to the sensor tip and a second plurality of fibers to transmit light from the tip to an opto-electronic detector. The tip comprises a reflective diaphragm sensitive to pressure changes within the combustion chamber. U.S. Pat. No. 4,924,870 to applicant discloses an optical fiber pressure sensor tip comprising a single optical fiber. The single fiber carries dual light beams of differing wavelengths as input and the reflected return light beams. One wavelength serves as a reference signal that is reflected by an optical filter. The other wavelength passes through the optical filter and is reflected and modulated by a moveable diaphragm sensitive to pressure changes. This particular fiber optic sensor is of very small size, being intended for the measurement of intra-vascular blood pressure in human patients.

Two other patents to the applicant, U.S. Pat. No. 4,932,262 and U.S. Pat. No. 4,932,263, disclose a well having an optical fiber passing therethrough. A pressure sensitive membrane encloses at least a portion of the well. The underside of the pressure sensitive membrane includes an optical grating that couples with the wavelength of the light beam in the optical fiber so as to modify the light beam in response to pressure induced movement of the membrane. By making the sensor with techniques common to the manufacture of integrated circuits on chips, the sensor may be made small and rugged enough to locate on a spark plug in direct exposure to the combustion chamber of an engine.

A published paper co-authored by the applicant is entitled "Microbending Losses of Metal Coated Single Mode, Multimode, and Cladding-Free Fibers," Society of Photo-Optical Instrumentation Engineers, Vol. 985 Fiber Optic and Laser Sensors VI (1988) and discloses the test results of microbending various optical fiber constructions. The test results indicate the various attenuations of light beams as a function of microbending displacement of the fibers and wavelength of the light beams.

A second published paper co-authored by the applicant is entitled "A Fiber Optic Sensor for Combustion Pressure Measurement in a Washer Configuration," Society of Photo-Optical Instrumentation Engineers, Vol. 840 Fiber Optic Systems for Mobile Platforms (1987), and discloses a washer configuration for placement between a spark plug and engine cylinder head. Changes in combustion chamber pressure cause changes in the preload on the washer configuration. The washer configuration comprises upper and lower serrated washer halves with a continuous loop of optical fiber placed between the serrated washer halves. One end of the loop extends to a source of light and the other end of the loop extends to a photodetector.

In-cylinder pressure transducers are currently being considered for advanced engine control systems. Since cylinder pressure is the fundamental thermodynamic variable, it is used to determine a variety of engine parameters for closed-loop controls. In-cylinder pressure transducers are commonly used to determine apparent rate of heat release and indicated mean effective pressure (MEP). Cylinder pressure history is also used to determine the best air/fuel ratio in closed-loop controls, thereby significantly increasing fuel efficiency and reducing emission levels of polluting gases. In addition, in-cylinder pressure sensors are best suited to adjust an engine's operating state on a cylinder-to-cylinder basis to minimize torque variability for lean-burn operations.

In the area of engine diagnosis, in-cylinder pressure sensors provide a direct and deterministic misfire detection, while indirect torque-fluctuation-based techniques are hampered by their inability to distinguish misfire from factors such as incorrect spark-timing and rough driving conditions.

Under recently enacted California Air Resources Board Regulations, onboard misfire detection, as a part of the overall legislation-mandated exhaust emission reduction efforts, will become an important and integrated part of electronic engine monitoring and control systems. Similarly, knock control is widely accepted as a major aspect of engine controls. In-cylinder pressure sensing is best suited to detect high frequency knock signals without being complicated by factors such as cylinder-to-cylinder variability, shock, vibrations, and signal phase-delays, plaguing externally mounted sensors.

The benefits of combustion pressure-based engine controls have long been recognized. However, commercial applications have been largely limited due to the lack of suitable pressure sensors that meet performance, size, and cost requirements. A major obstacle in developing viable and cost-effective combustion pressure sensors has been to overcome sensor performance degradation caused by adverse operating conditions, which include high combustion temperatures and strong electromagnetic interference (EMI). Long-standing and extensive efforts have been devoted to develop piezoelectric- and piezoresistive-type combustion pressure sensors, with limited successes in overcoming two inherent limiting factors. The first limiting factor is that sensing crystals cannot withstand high temperatures (above 125° C. for piezo-resistive and 300° C. for piezo-electric). Therefore, a transfer-pin is necessary to connect a pressure sensing diaphragm to the crystal, thereby locating the temperature-sensitive crystal away from high combustion temperatures. Such a construction is complicated in that temperature gradients presented to the mechanical assembly may induce response characteristics variations, such as hysteresis and other errors.

The second limiting factor is that signal conditioning electronics must be located at the sensor head to combat strong EMI effects. This routinely subjects the components to temperatures well over 125° C., and complicates reliability and cost considerations. Along with the delicate sensing crystals, the electronic chip on the sensor head must be well shielded both electrically and thermally, leading to an enlarged sensor profile.

Consequently, these stand-alone sensors present difficulties in engine mounting as electronically controlled, multi-valve engines offer little available space. Further, caution must be exercised to avoid complications induced by ground-loops in an engine environment. So far, sensors based on the conventional technologies have not been able to meet overall cost, reliability, size, and high-temperature durability requirements for engine control applications.

Fiber-optic sensors for high-temperature pressure-sensing applications generally consist of fused-silica optical fibers embedded in metal-sensing fixtures, and are powered remotely by electro-optical modules. All components in the sensor heads are made of high-temperature-resistant materials that function without provisions for cooling or heat shielding. The sensors are electrically passive such that EMI and ground-loop problems are obviated. Although extensive fiber-optic sensor development work has been reported, the effort has been mainly toward the aerospace industry and more recently biomedical applications using low-cost disposable devices.

Adaptation of fiber-optic sensors to automotive applications is particularly challenging because: (1) The sensor must survive operating temperatures up to 750° C., (2) the sensor must provide accurate readings over operating pressure, temperature, vibration, and electromagnetic interference ranges encountered in the engine environment, (3) the sensor must maintain required reliability and accuracy up to over 100,000 miles of car operation, and (4) the sensor must meet the technical requirements at an extremely low cost.

Among various types of fiber-optic sensors, the most promising candidate for low-cost automotive applications is the simple intensity-modulated sensor. This sensor utilizes an optical fiber in front of a flexing diaphragm for optical reflection measurement of pressure-induced deflections. By employing this sensing principle coupled with a hermetically sealed sensor structure to eliminate diaphragm oxidation at high temperatures, and as discussed in my co-pending patent applications, a sensor can operate in a stable way under exposure to high cylinder combustion temperatures.

However, the use of a flat diaphragm in this design can result in poor reliability over long-term exposure to high pressure and temperature cycling. The primary reliability problem of flat diaphragm-based sensors for combustion pressure monitoring has to do with potential diaphragm fatigue resulting from continuous exposure to hundreds of thousands of pressure cycles. Since diaphragm deflections required in intensity encoded fiber optic designs are typically between 10 and 20 microns, high stress regions can be created at the diaphragm's center and at the clamped edge. While using a thicker diaphragm may result in reduced stresses and improved reliability, diaphragm deflection becomes too low for required optical signal changes.

The other problem of the diaphragm-based fiber optic sensors is related to the location of the laser welded area combining the diaphragm and the housing. The exposure of that area to extreme combustion temperatures over long time may cause sensor failure due to diaphragm yield.

Finally, flat diaphragm-based fiber optic sensor designs require the use of thick diaphragms for overpressure protection. For a typical overpressure range of 2000 psi, this means that diaphragm thickness may be increased as much as 50% reducing its deflection as much as 75% compared to a diaphragm designed for 1000 psi.

Thus, this disclosure describes a number of improvements in the metal diaphragm-based fiber optic combustion pressure sensor for improved reliability under conditions of long-term pressure and temperature cycling. The design also reduces the sensor's inaccuracies resulting from combustion flame kernel effect and provides for improved overpressure protection compared to a flat-disk based design.

Integration of the fiber optic sensor in the spark plug package offers a number of important benefits to automotive manufacturers compared to stand alone sensor designs. Due to restricted access area into a cylinder of a modern multi-valve engine, engine head space available for sensor installation is very limited. A spark plug-integrated sensor would clearly alleviate that problem. Installation of the sensing spark plug may be as simple as the spark plug itself. Due to high temperature capability, EMI immunity, and potentially small size, fiber optic sensors are perhaps the only types of sensors that can be incorporated into a sensing spark plug.

SUMMARY OF THE INVENTION

The invention comprises a series of significant further improvements in fiber optic sensors intended to be exposed to cylinder combustion chambers.

The configuration of a varying thickness diaphragm for a fiber-optic sensor permits reduced stress levels in the diaphragm and an increase in deflection at the center point of the diaphragm. Location of the hermetic seal between the optic fiber and the ferrule carrying the optic fiber is removed from proximity near the diaphragm and placed away from potential heat cycle degradation.

Overpressure effects to the sensor are minimized by polishing a portion of the diaphragm end of the sensor body to a taper, integrating a metal stop within the fiber ferrule or adding a separate ferrule to surround the optical fiber and polishing a part of the ferrule to an angle.

The invention further comprises means for sealing the ferrule to the optic fiber to prevent oxygen infiltration and the consequent degradation to the fiber.

The invention also comprises a process for sealing the fiber to the ferrule to isolate the cavity through the body of the sensor.

The configuration of the fiber optic diaphragm sensor permits direct exposure of the diaphragm to the combustion chamber and therefore the sensor directly senses the pressure fluctuations in the chamber. This is distinguished from washer-type sensors which are located under spark plugs or bolt heads and therefore indirectly monitor combustion pressure. Direct exposure sensors tend to provide improved signal to noise ratio, in particular at low pressures, and therefore offer better performance. The direct exposure, however, subjects the sensor, in particular, the diaphragm at the tip to the instantaneous temperatures in the combustion chamber.

Another version of the invention disclosed herein comprises a sensing spark plug with an integrated optical/high voltage connector. Integration of the sensor to the spark plug offers a number of important benefits to automotive manufacturers. In this version the sensor becomes the top element of the electrode. This version also deals with affixing the sensor to the electrode and the shielding and quenching of the electrode top element from the combustion to reduce diaphragm thermal errors and prevent the heat from damaging the optical fiber.

Further versions of the invention disclose modifications that can be applied to adapt spark plugs for the new fiber optic sensors. These particular modifications are particularly advantageous because they only require forming passages in the metal shell of a conventional spark plug. Moreover, the passages can optionally be formed either when the metal shell is made or after the entire spark plug is manufactured. Thus, these versions have the very clear advantage that present day spark plug manufacture need not be disturbed. Only subsequent steps in manufacture need be added to form the passages in the spark plug metal shell.

Figure 15:
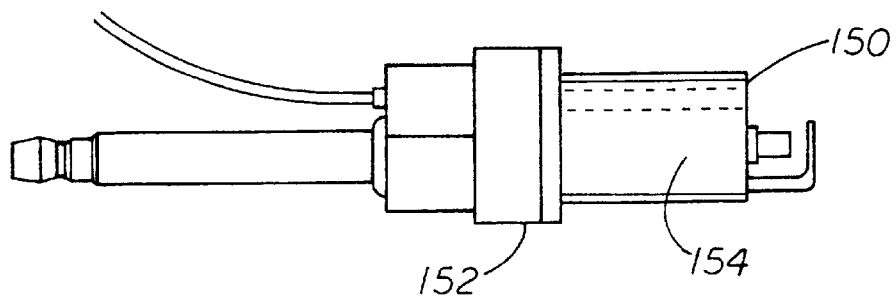
Figure 16:
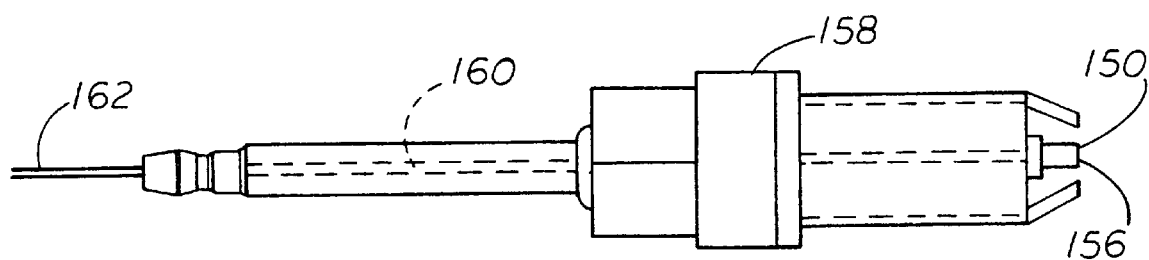
Figure 17:
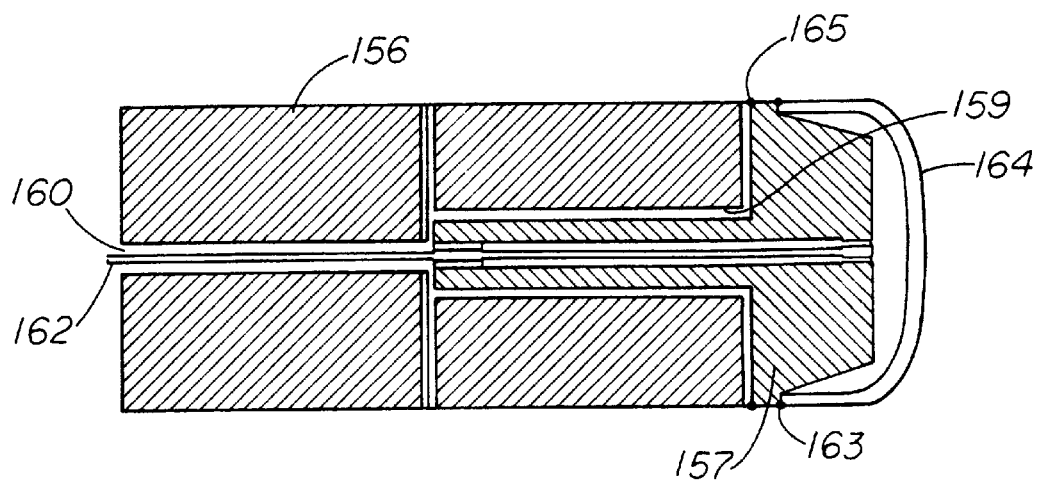
Figure 18:
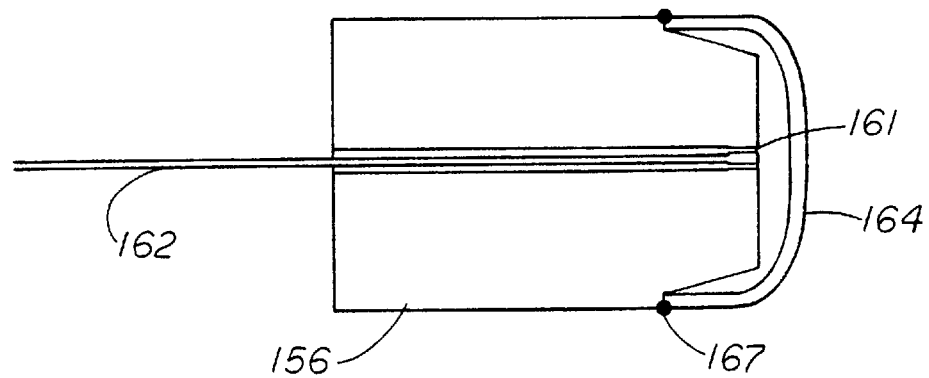
Figure 19:
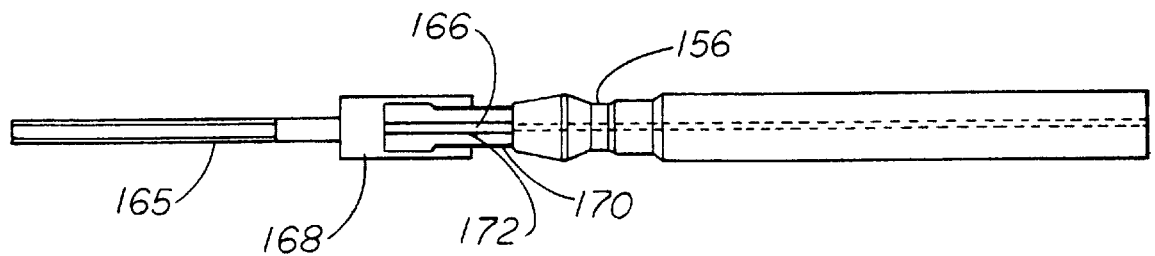
Figure 20:
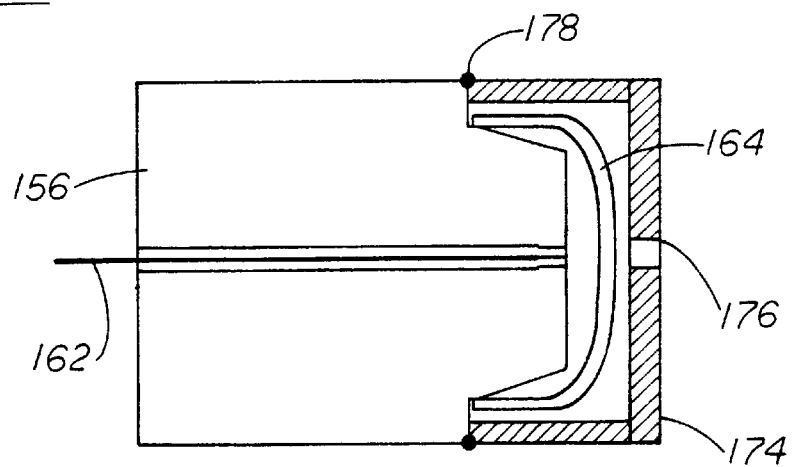
Figure 23:
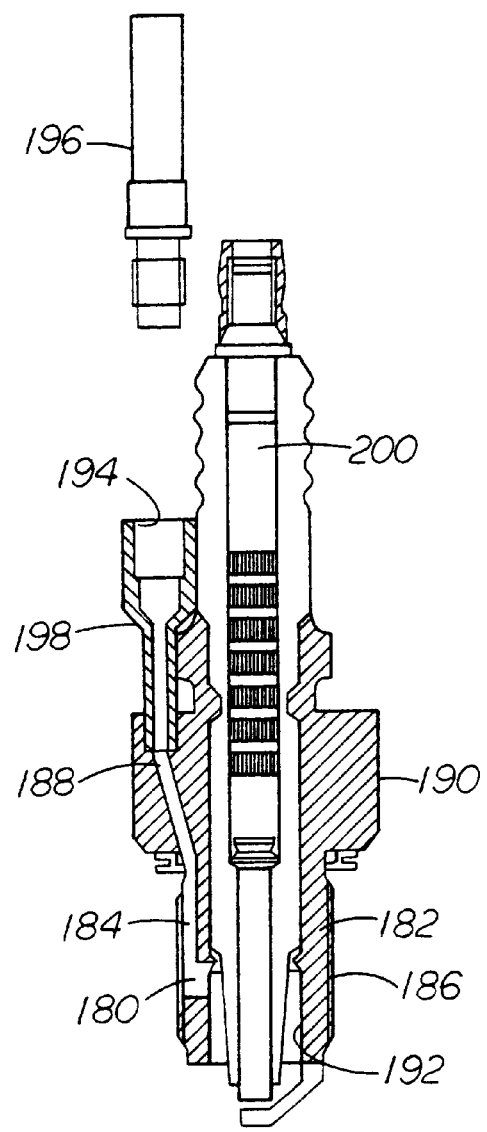
Figure 24:
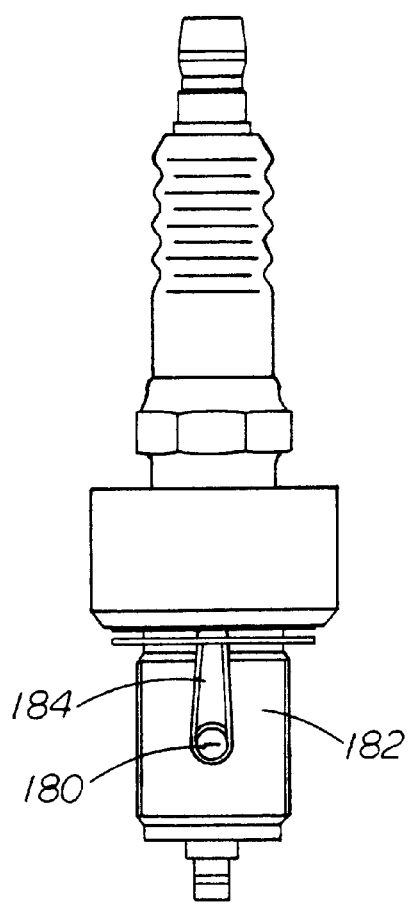
Figure 25A:
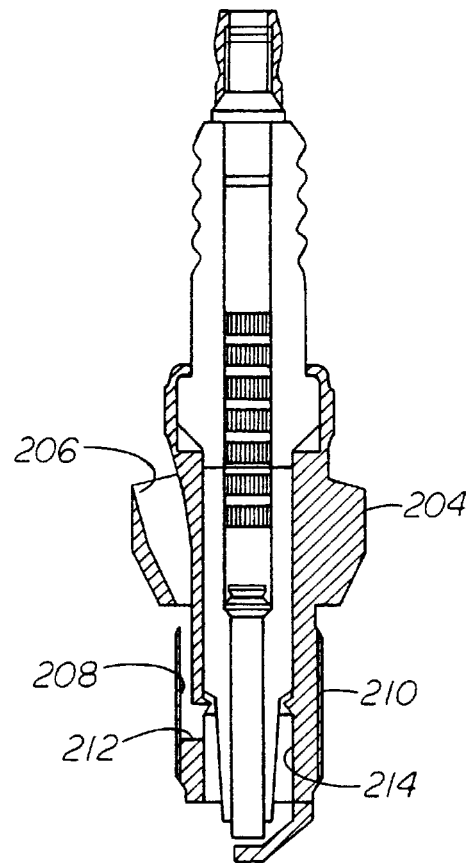
Figure 26:
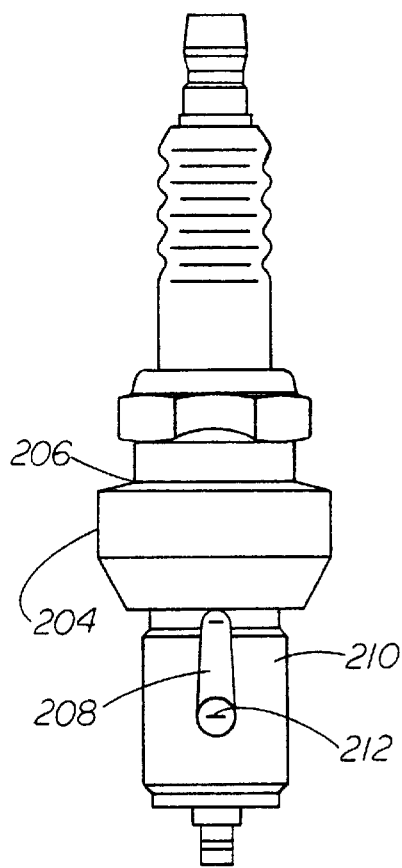
Figure 25B:
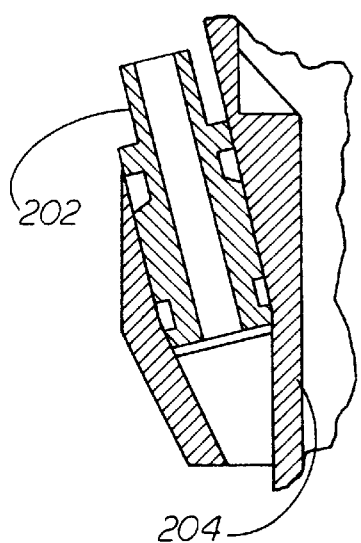
Figure 27:
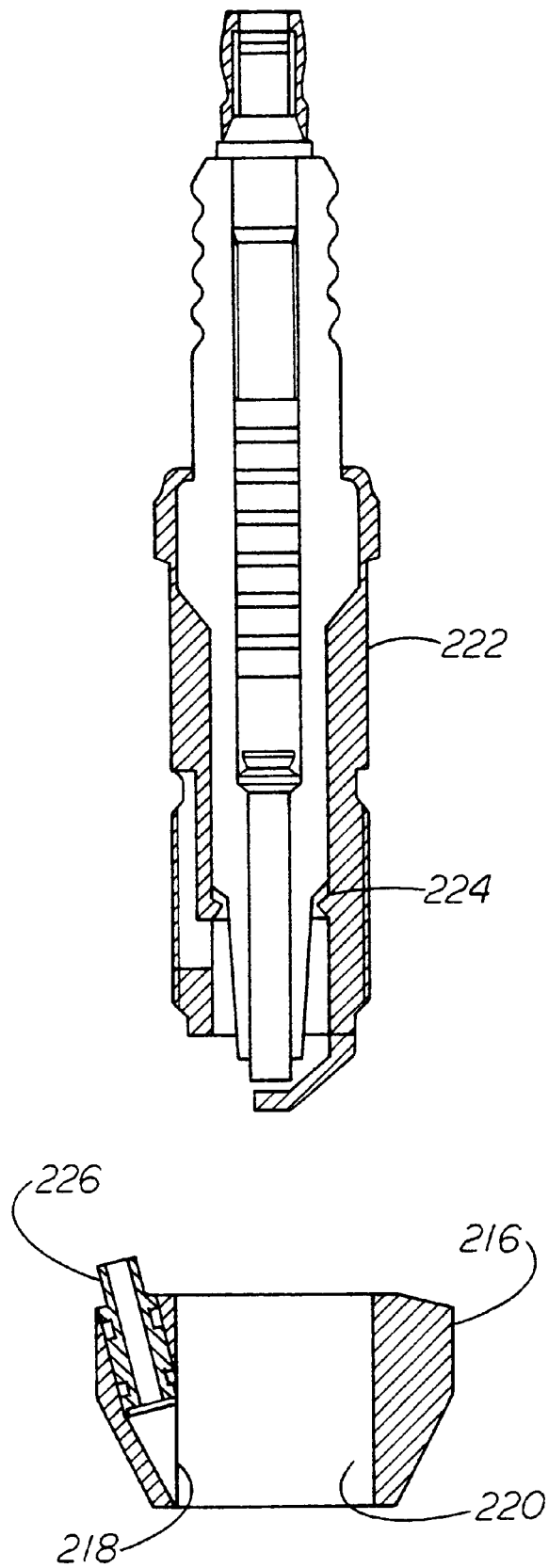

PIG. 14 illustrates a cross-sectional view of a sensor housing with a fiber-ferrule having one section of the ferrule polished to provide a mechanical stop for overpressure protection;

FIG. 15 illustrates a side view of a spark plug with an off-axis located fiber optic sensor;

FIG. 16 illustrates a side view of a sensing spark plug with an axially located fiber optic pressure sensor;

FIG. 17 illustrates a cross-sectional view of a sensor housing separate from the central electrode;

FIG. 18 illustrates a cross-sectional view of a sensor housing combined with the central electrode;

FIG. 19 illustrates a partial cross-sectional view of a central electrode with an integrated fiber optic/electrical connector;

FIG. 20 illustrates a side cross-sectional view of a flame shield/flame quencher for the central electrode;

FIG. 21 illustrates in cross-sectional view a conventional spark plug modified with a passage in the metal shell;

FIG. 22 illustrates in side view the modified spark plug of FIG. 21;

FIG. 23 illustrates in cross-sectional view a conventional spark plug modified with a passage in the metal shell and sensor cable parallel to the central electrode;

FIG. 24 illustrates in side view the modified spark plug of FIG. 23;

FIG. 25 illustrates in cross-sectional and exploded view a conventional spark plug modified with a passage in the metal shell and a metal extension tube for the sensor;

FIG. 26 illustrates in side view the modified spark plug of FIG. 25;

FIG. 27 illustrates in exploded cross-sectional view a conventional spark plug modified with a separate metal ring and with both the plug and the ring having passages therethrough;

FIG. 28 illustrates in cross-sectional view a conventional spark plug modified by forming a channel in the ceramic element about the central electrode; and FIG. 29 illustrates in side view the modified spark plug of FIG. 28.

DESCRIPTION OF THE PREFERRED EMBODIMENTS

Figure 1:
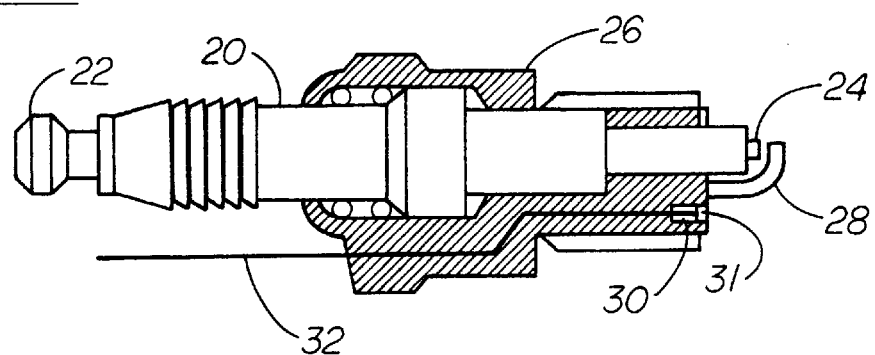
FIG. 1 is a side cross-section of a spark plug, incorporating a diaphragm fiber optic sensor.
Figure 2:
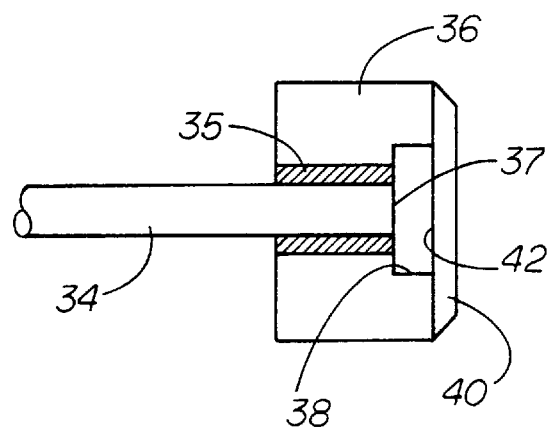
FIG. 2 is a typical cross-section of a diaphragm type fiber optic sensor.

In FIGS. 1 and 2 the spark plug shown includes a conventional ceramic core 20 that contains a conductor 22 leading to the center pole 24. The ceramic core 20 is permanently affixed in a metal sleeve 26 to which is attached the other pole 28. In the typical conventional spark plug the ceramic core 20 is concentric with the metal sleeve. However, as shown in FIG. 1 the core 20 is radially offset from the centerline of the sleeve. The offset provides additional metal thickness in the sleeve 26 for a sensor 30 and fiber optic transmitting cable 32 leading to the sensor.

The sensor 30 is located in a small bore or cavity in the metal sleeve with the sensor tip exposed 31 to combustion pressure and temperature adjacent the poles 24 and 28 of the spark plug. A simple form of a diaphragm sensor is illustrated in FIG. 2. The fiber 34, which may be a fiber bundle, is fitted within a sensor body 36 and terminates at a small round cavity 38. A ferrule 35 surrounds the tip end 37 of the fiber 34. The diaphragm 40 covers the cavity 38. The diaphragm 40 is mirror finished 42 on the cavity side. The light delivered by the fiber 34 to the sensor 30 is reflected back into the fiber 34 by the mirror finish 42 on the back of the diaphragm. Thus the amount of light reflected by the diaphragm 40 back into the fiber 34 increases and decreases with increases and decreases in pressure on the diaphragm.

Increased pressure on the diaphragm 40 causes the diaphragm to flex into the cavity 38 and in so doing the light reflected back is modulated. The very small diaphragm detector 30 shown as inserted in the spark plug of FIG. 1 is subjected to the extreme of combustion temperature in close proximity to the poles 24 and 28. Therefore, the tip of the glass fiber 34 is subjected to potentially damaging temperatures and therefore a degradation of signal to noise ratio. Thus, even though the sensor need not be calibrated against pressure or temperature since only relative measurements are required for knock or misfire identification, a good signal to noise ratio is important.

Figure 3:
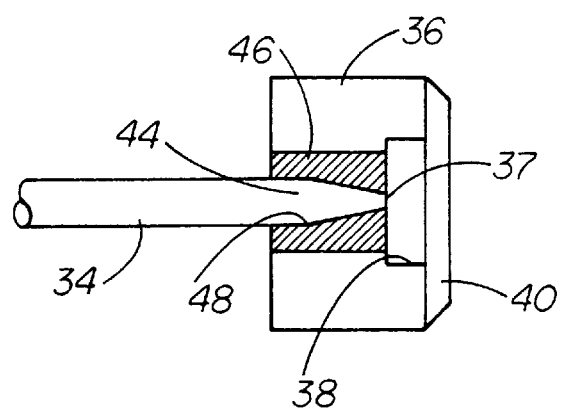
FIG. 3 is an illustration of the tapered end of an optical fiber.

A diaphragm sensor should also have a large band width and low cost. Because of the small size of the diaphragm sensor in a spark plug and overpressure requirements, diaphragm deflection is quite small, on the order of 15 microns. This small deflection limits optical modulation and consequently signal to noise ratio and system frequency response. FIG. 3 illustrates the first of two improvements in a diaphragm sensor that significantly increase the signal to noise ratio without significantly increasing sensor cost. In a diaphragm sensor as pressure increases, the diaphragm is deflected inward toward the tip end of the optical fiber. The amount of light collected by the tip end of the fiber, after reflection from the diaphragm, increases monotonically with pressure.

For a given sensor size and diaphragm thickness, optical modulation depth can be increased through a suitable selection of fiber core diameter and numerical aperture (NA). The numerical aperture dependence is almost linear and the sensor size dependence is approximately linear with an inverse of fiber diameter. Thus, maximum modulation can be obtained for fibers with small diameters and large NA. A high NA also favors the optical power carrying capability of the fiber, which is a function of the square of the NA. However, reduced fiber diameter reduces power level by a square function of the diameter.

For example, modulation levels of 3 mm diameter sensors range between 8% and 12%, based on the use of a 100 micron thick diaphragm and a 100 micron diameter 0.29 NA fiber. Typical signal to noise ratios are in the range of 100 to 200 for such sensors when energized by a relatively low cost opto-electronic transceiver.

Figure 4:
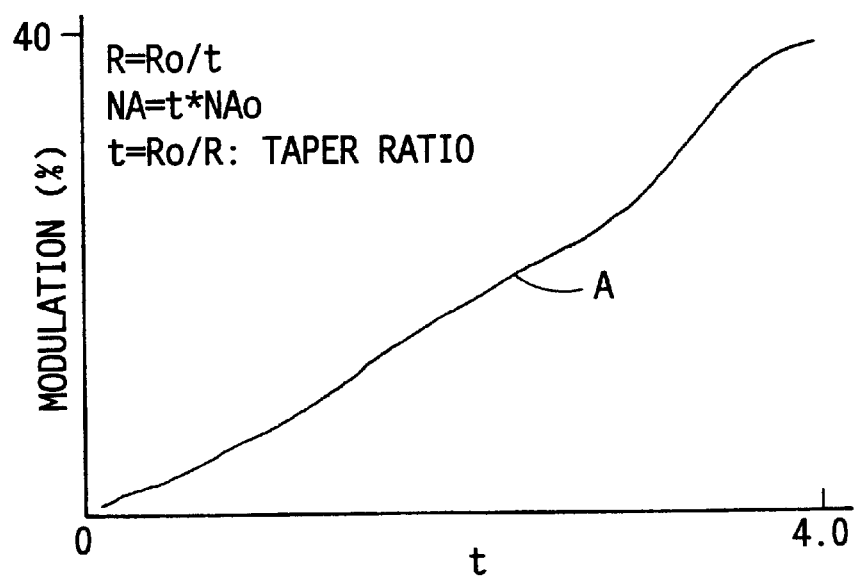
FIG. 4 is a graph of modulation depth increase versus taper ratio for the tapered fiber of FIG. 3.

In FIG. 3 the fiber or fiber bundle 34 is tapered 44 within the conical ferrule 46. The conical taper 44 adjacent the tip end 37 results in both a size reduction and an increase in NA for the tip end. The increase in NA is approximately proportional to the ratio of untapered to tapered fiber tip end diameters. FIG. 4 illustrates the theoretical difference between the modulation depth and the taper ratio by the curve A. An improvement in modulation depth approaching 40% can be obtained by drawing down the fiber 34 to a taper ratio of 4 to 1.

While the fiber conical taper 44 adjacent the tip end 37 increases the modulation depth significantly, the transmission losses also increase due to the leakage of higher-order guided modes in the tapered region of the fiber. These transmission losses can be significantly reduced by plating a thin layer 48 of reflective metal onto the taper surface. By the selection of a suitable metal, such as gold, the metal layer serves as an interface bonding material for brazing the conical ferrule 46 to the fiber.

Figure 5:
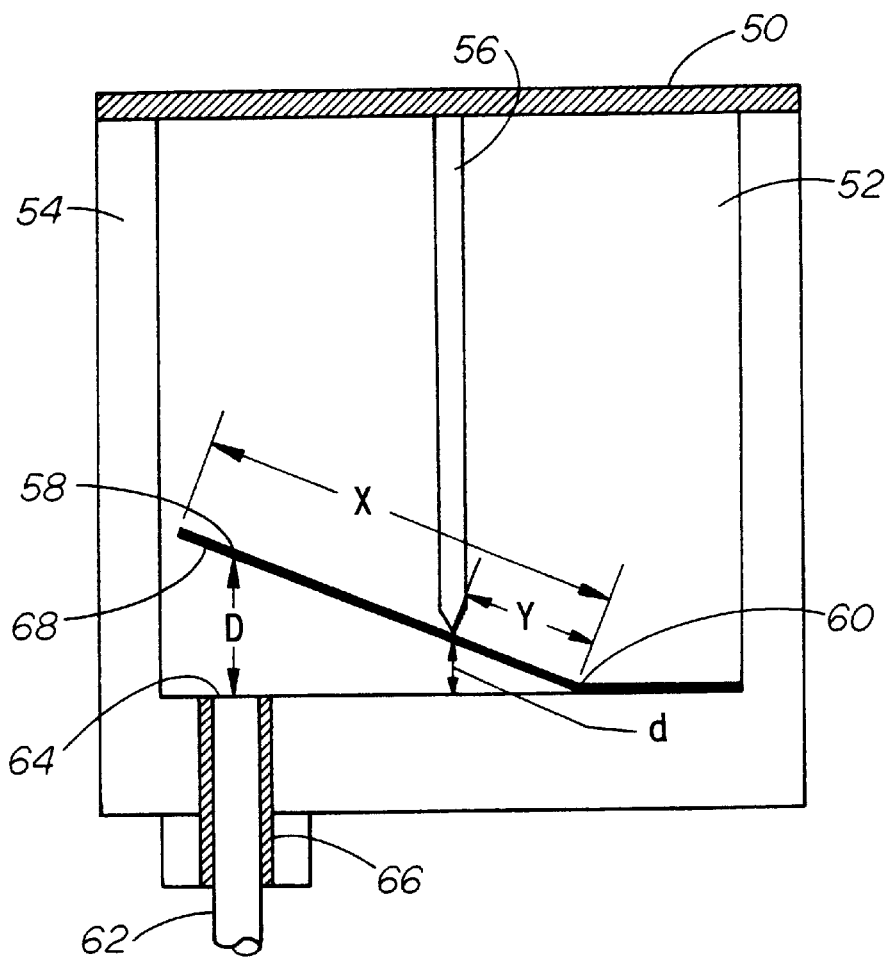
FIG. 5 is an illustration of a mechanically leveraged dual diaphragm sensor structure.

In FIG. 5 an alternative improvement to the diaphragm sensor not only increases modulation depth but also spaces the tip end of the optical fiber a significantly greater distance from the diaphragm exposed to the heat in the cylinder combustion chamber adjacent the spark plug electrodes. Specifically, the mechanical diaphragm 50 is mounted over the cavity 52 opening in the sensor body 54. Within the cavity 52 is a transfer pin 56 mechanically connected to the center of the diaphragm 50 where maximum diaphragm deflection occurs. An optical diaphragm 58 is hinged at a fulcrum location 60 and urged against the transfer pin 56 by the resistance to bending of the optical diaphragm at the fulcrum location.

Figure 6:
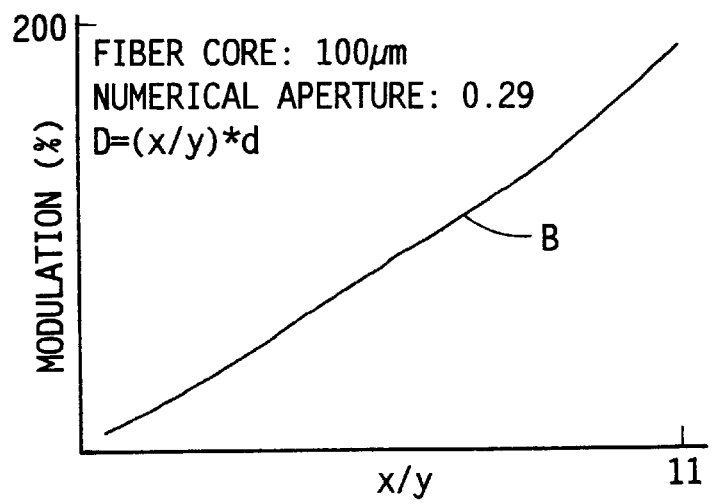
FIG. 6 is a graph of modulation depth increase versus leverage ratio for the sensor structure of FIG. 5.

An optical fiber or fiber bundle 62 penetrates the sensor body 54 with the tip end 64 in optical communication with the cavity 52. A ferrule 66 seals the optical fiber 62 to the sensor body 54. The tip end 64 is spaced from the fulcrum 60 a considerable distance more than the engagement of the transfer pin 56. The side 68 of the optical diaphragm 58 facing the tip end 64 is reflective to efficiently return light to the optical fiber 62. Thus, displacement of the mechanical diaphragm 50 in response to pressure changes in the combustion chamber causes displacement of the optical diaphragm 58 about the fulcrum 60 and significantly increased displacement of the optical diaphragm relative to the tip end 64 of the optical fiber 62. In FIG. 6, the curve B illustrates the modulation depth increase versus the leverage ratio defined as the total length (X) of the optical diaphragm 58 from the fulcrum 60 to the distance (Y) of the transfer pin 56 to the fulcrum 60 along the optical diaphragm 58. In FIG. 6 the results for a 3 mm transfer pin 56 and 3 mm diameter sensor body 54 are presented. For a mechanical diaphragm 50 deflection of 20 microns, the optical diaphragm 58 moves about 200 microns at an X/Y leverage ratio of 10:1. The result is a modulation depth increase of about 160%.

Depending on the length of the transfer pin 56, temperatures up to 800° C. adjacent the mechanical diaphragm 50 may be accommodated. The separation of the mechanical and optical diaphragm functions lessens or removes a critical design aspect present with conventional diaphragm-based fiber optic pressure sensors. The separation increases the modulation levels and decreases the fiber 62 temperature at the tip end 64 and ferrule 66.

Usually the choice of diaphragm is a compromise between diaphragm strength and diaphragm reflectivity.

High diaphragm reflectivity and reflectivity stability under high temperatures are the primary requirements for sensitive and stable diaphragm sensors. Materials with such reflective characteristics such as platinum, have relatively low strength and therefore can limit operating pressure ranges. Inconels and special grades of stainless steels are usually the best compromises.

By separating the diaphragm functions in the new design, the mechanical diaphragm 50 selection is based on mechanical characteristics such as high strength, large deflection and hysteresis-free operation under conditions of high temperatures and pressures. Thus, any metal or alloy possessing the necessary characteristics but without regard to reflectivity might be selected.

The optical diaphragm 58, however, may be selected on the basis of best reflectivity and ability to repeatedly flex about the fulcrum 60 the slight amount under displacement by the transfer pin 56. Thus, platinum is a particularly good choice for the optical diaphragm material.

The fiber tip 64 and ferrule 66 temperature can be controlled by the selection of the transfer pin 56 length and material and the sensor body 54 material and shape. With the spark plug integrated sensor, the use of a 3 mm long transfer pin 56 may reduce fiber tip 64 temperature by as much as 200° C. in comparison with a combined function diaphragm sensor. Such a temperature drop results from the effect of engine coolant flowing in the spark plug proximity.

A critical requirement for a commercially viable misfire and knock detection system is low cost. While the cost of the diaphragm type sensors above can be very low the total system cost must be acceptably low. When a conventional opto-electronic coupler is used the cost may be unacceptably high because the opto-electronic coupler is the most expensive part of the transceiver.

Such a transceiver comprises one or more light emitting diodes (LEDs) and one or more photodiodes. Presently available bidirectional opto-electronic couplers are unacceptably expensive for low cost automotive applications. LEDs may be also expensive if their beam sizes are small, as typically required for conventional couplers.

Figure 7:
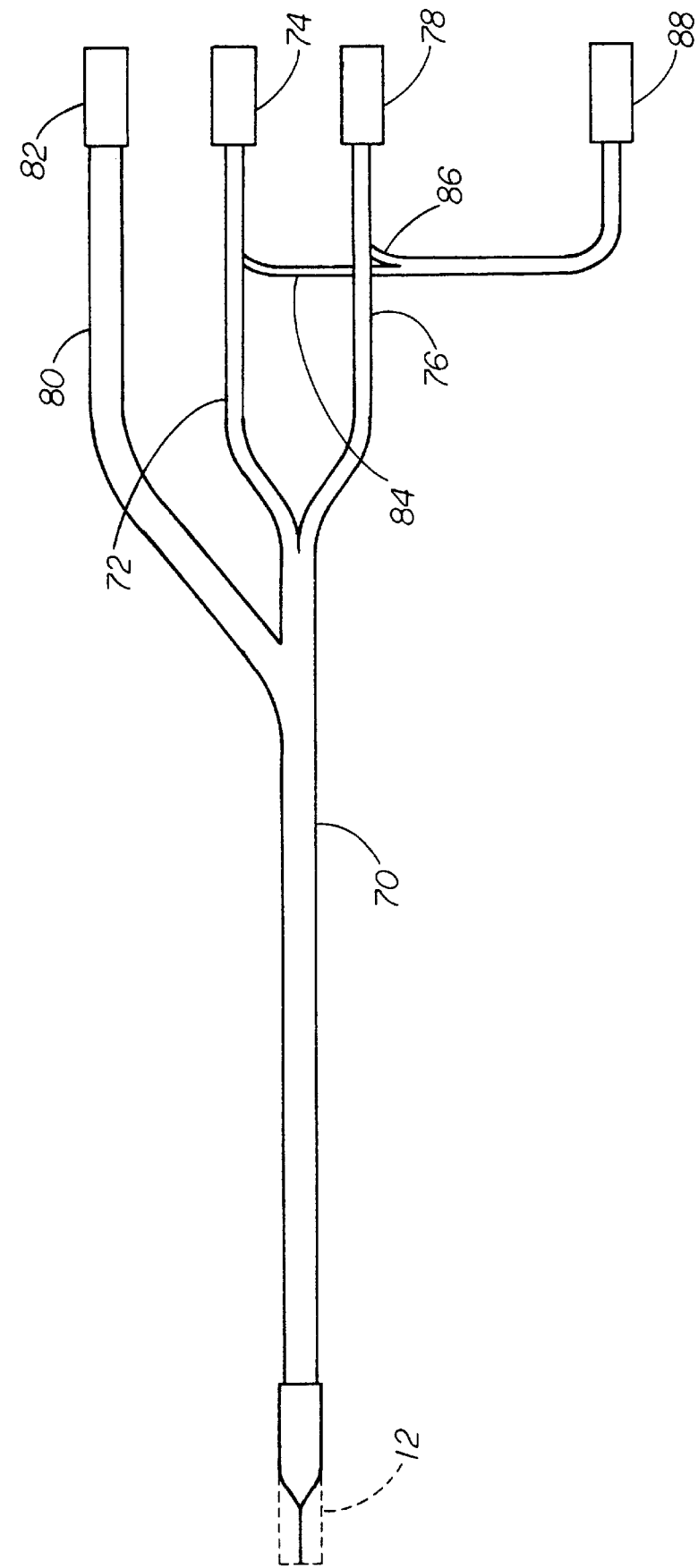
FIG. 7 is an illustration of a distributed fiber optic bundle from the sensor to the sources of light and the detectors.

A low cost and effective solution for the opto-electronic coupler is illustrated in FIG. 7. This solution can offer virtually the same optical power as much more expensive couplers, permits the use of individual low cost LEDs, and individual low cost photodiodes. The basis of the solution is the use of low cost borosilicate fiber bundles tapered or untapered into the diaphragm sensor as explained above and a divisional arrangement of the fibers at the opto-electronic coupler end.

As shown in FIG. 7 the fiber bundle 70 extending from the sensor is divided at the coupler end into dedicated subgroups for each opto-electronic element. For example, eight fibers 72 extend to LED 74 and another eight fibers 76 extend to LED 78. Sixteen fibers 80 extend to the photodiode in the measurement detector 82. Three fibers 84 and 86 from each LED 74 and 78 extend directly to the reference detector 88. With such an arrangement the light from the LEDs is efficiently coupled into the transmitting fiber bundle 70 and into and from the sensor.

As an example, 50 micron borosilicate fibers (extensively used in fiber optics) may be utilized. Depending on LED and sensing fiber sizes, as many as 100 fibers can be used in the transmitting fiber bundle. Alternatively, a larger (150 micron) diameter and fewer fibers can be used. Regardless of the number of fibers, the fibers in the fiber bundle 70 that transmit light from the LEDs and return light to the measurement detector 82 may be fused and tapered at the sensor end to a diameter suitable for the tip end 37 (FIG. 3). Such a taper, which may be fabricated in a straight forward way by thermal fusing of borosilicate fibers and pulling during fusing.

The number of fibers in the subgroups connected to either the LEDs or the photodiodes may be adjusted to optimize the power received by a photodiode. In effect, the number of fibers in each subgroup is determined by the maximum power to be received at the measurement detector 82. The various losses are distributed to obtain maximum received power even though some individual collection efficiencies such as at the LEDs are compromised. Low cost LEDs typically launch divergent and large light beams. Large bundles of fibers can be used to collect the light from the LEDs. With borosilicate fibers having typically high numerical apertures of 0.5 to 0.6, the collection efficiency into a fiber bundle is enhanced. At the tapered end of the fiber bundle, taper loss is reduced by a metal coating over the taper and inside the connector 12.

Figure 8A:
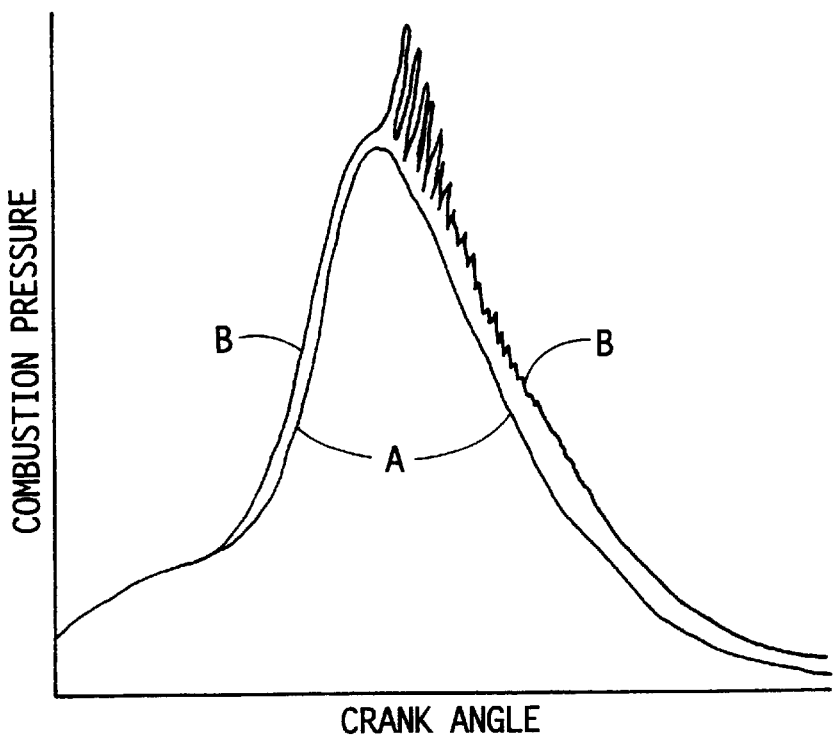
FIGS. 8a and 8b illustrate the effect of knock on the cylinder pressure waveform.
Figure 8B:
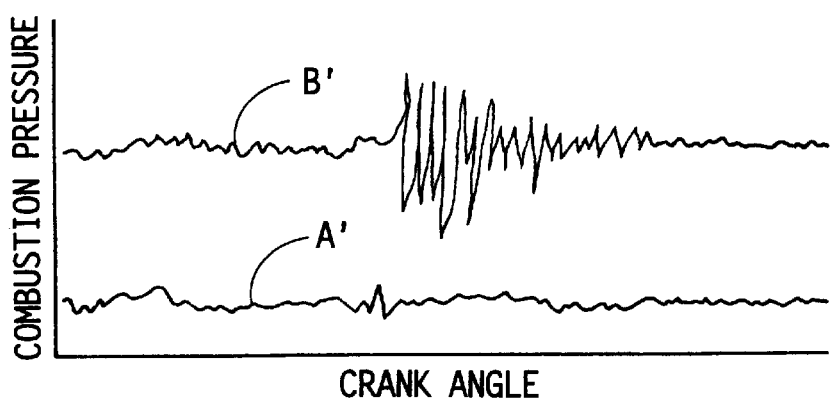

FIGS. 8 and 9 illustrate respectively the superposition of the knock signal on the pressure waveform and the misfire displacement or dip of a portion of the pressure waveform. Thus, in FIG. 8a curve A is the typical or expected waveform for combustion pressure in the cylinder and curve B exhibits the effect of knock on the waveform. Knock clearly causes a relatively high frequency pressure fluctuation which can with suitable electronic analysis in the ECM be isolated and amplified as shown by the comparison of curves A' and B' in FIG. 8b.

Figure 9A:
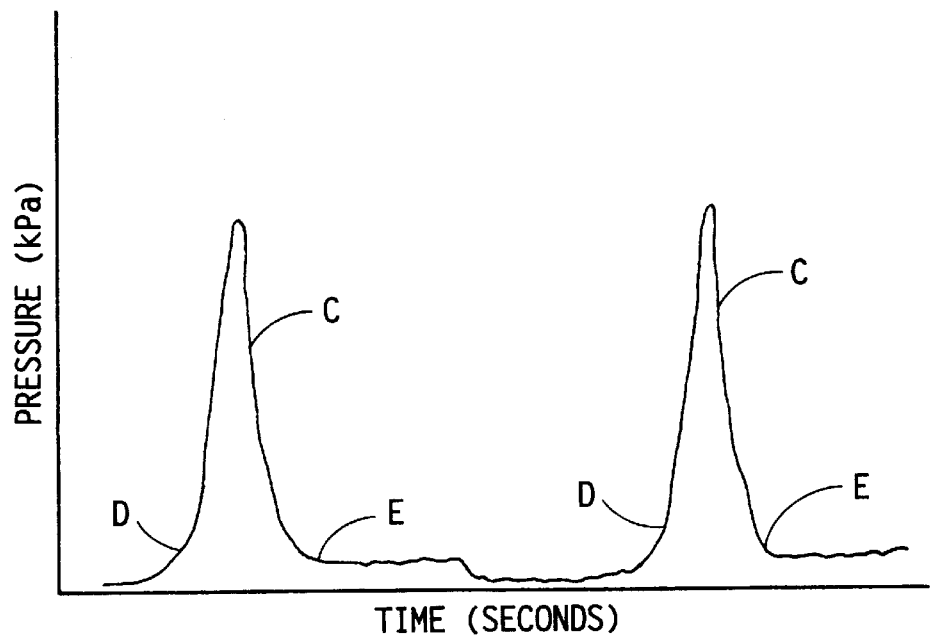
FIGS. 9a and 9b illustrate the effect of misfire on cylinder pressure waveform.
Figure 9B:
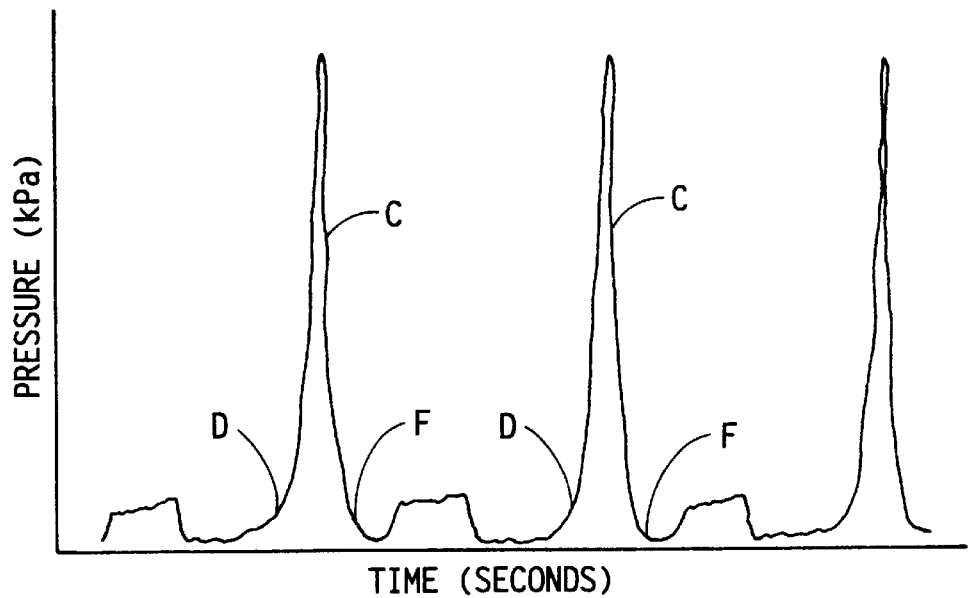

In FIG. 9a a multiple pressure waveform for cylinder pressure is illustrated by Curve C. The "knee" at the beginning D and end E of each compression and combustion stroke are substantially similar in shape (substantially symmetric about the peak of curve C). In FIG. 9b, however, the symmetry of curve C about the peak is lost at the "knees". Rather, a pronounced displacement downwardly or dip is exhibited at F in the knee of the curve following the peak.

For knock or misfire detection an autocorrelation technique can uniquely identify knock or misfire. In the absence of knock or misfire, the output of the autocorrelation function applied to the pressure waveform stored in memory in the ECM and the waveform of a particular cylinder results in essentially a zero value. In the presence of knock or misfire, the normalized output of the autocorrelation function approaches unity resulting in the unique detection of either or both of the two combustion anomalies. The physical embodiment of the autocorrelation function can be realized in digital form using Digital Signal Processing integrated circuits which offer the capabilities of sufficiently high speed real time autocorrelation calculations.

Figure 10:
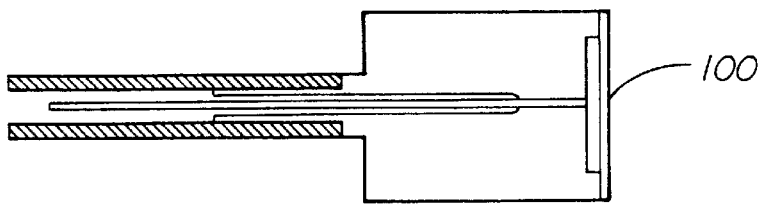
FIG. 10 illustrates a side cross-section view of a flat diaphragm-based fiber optic pressure sensor.

FIGS. 11–14 illustrate improvements to fiber optic diaphragm sensors that are the subject of this continuation-in-part application whereas FIG. 10 illustrates the current form of the embodiment above.

Figure 11:
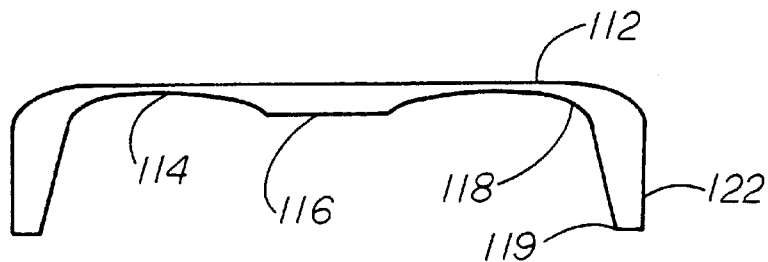
FIG. 11 illustrates a cross-sectional view of a non-uniform thickness diaphragm.

Turning to FIG. 11, the improved characteristics of the sensor construction of this patent application are in large part due to the use of a cup-shaped diaphragm 112. Both the shape and the thickness of the diaphragm 112 vary in the radial direction.

Varying diaphragm dimensions offer three fundamental benefits for fiber optic pressure sensors. Firstly, reduced stress levels are achieved in the flexing diaphragm without reduction of its deflection. Through a thickening of the material in the diaphragm center 116 and the corners 118, stress levels in these areas can be reduced by an order of magnitude compared to those of a flat disk of the same thickness. By thinning the diaphragm thickness about halfway at 114 between the center 116 and the corner 118, maximum deflection of the center 116 is restored to the value of a disk diaphragm 100 in FIG. 10. Under optimized conditions, the cup thickness may vary by as much as 50%. By additional tapering of the vertical wall or skirt 122 thickness, deflection of the center 116 may be further increased.

Secondly, the diaphragm to housing weld joint 119, located at the periphery of the cup, is not exposed to the direct effect of combustion flame; consequently, the weld joint is subjected to much lower temperatures as compared to a flat disk diaphragm 100.

Thirdly, the increased thickness, and associated thermal mass, in the diaphragm center 116 reduces the effect of flame kernel by minimizing the temperature gradient between the center 116 and the edges of the cup 122. In a flat disk design 100 (FIG. 10), hysteresis in combustion pressure response was observed which is believed to be due to localized excess temperature at the diaphragm center.

Figure 12:
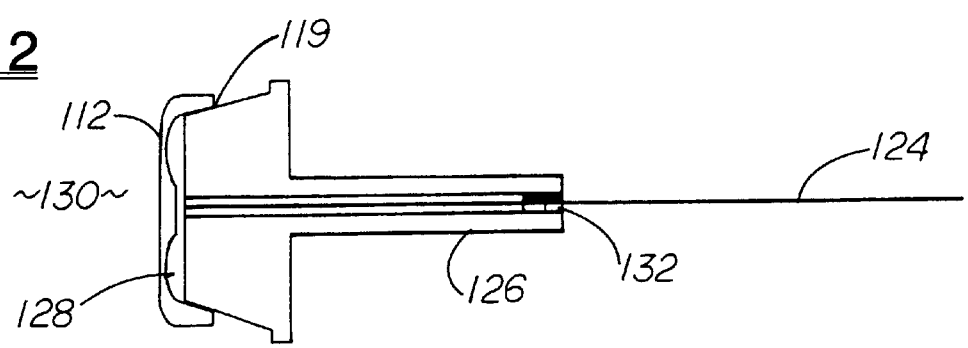
FIG. 12 illustrates a cross-sectional view of a sensor with a fiber-ferrule assembly showing the hermetic seal located at the bottom of the ferrule.

Referring to FIG. 12 another aspect of this invention is the location of the hermetic seal joint between the optical fiber 124 and the holding ferrule 126. As was discussed above in the parent patent application, the cavity 128 between the fiber and the diaphragm needs to remain hermetically sealed throughout sensor's lifetime so diaphragm reflectivity does not degrade due to oxygen diffusion into the cavity. While this hermeticity can be maintained for a short period of time and constant temperature for a fiber brazed at the top of the ferrule, long-term hermeticity may degrade under heat cycling conditions due to large thermal expansion coefficient mismatch between the fused silica fiber and the metal ferrule.

A novel approach of this invention is to move the seal point between the fiber 124 and the ferrule 126 away from the high temperature area 130, near the diaphragm 112, to the bottom of the ferrule at 132, as shown in FIG. 12.

Due to rapid decrease in the sensor temperature moving away from the combustion area 130, resulting from the cooling effect of engine coolant, the operating temperature of the metal ferrule to fiber seal may be as low as 200° C. for a sufficiently long ferrule compared to 600° C. at the diaphragm 112 of the sensor. In a spark plug-integrated version of the sensor, the hermetic seal joint may be right at the ground electrode proximal end. Sealing the fiber can be accomplished using relatively low temperature brazing or soldering techniques. Alternatively, a polyimide-based epoxy or a low temperature melting glass can be used to hermetically bond the fiber to the ferrule.

Figure 13:
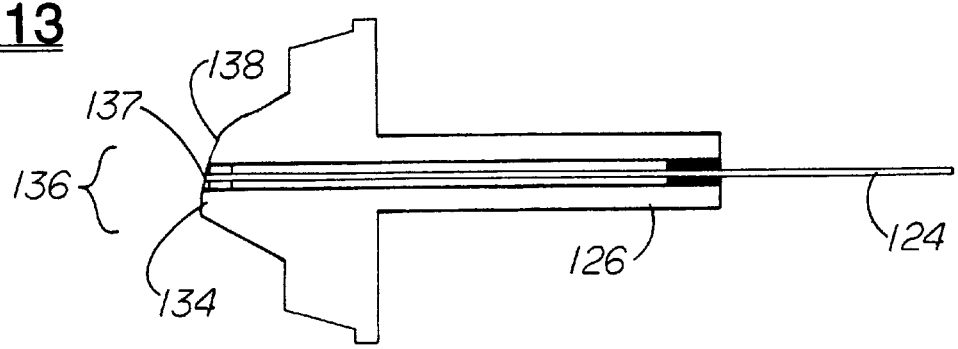
FIG. 13 illustrates a cross-sectional view of a fiber-ferrule showing a mechanical stop for overpressure protection.

Yet another aspect of this invention is the increased resistance of the sensor to overpressure. This resistance is accomplished through the use of a specially shaped and angled metal stop 134 formed on the tip 136 of the fiber ferrule 126 as shown in FIG. 13. The shape of the ferrule tip 136 allows the center 116 of the diaphragm (not shown) to hit the ferrule 126 without damaging the fiber 124 when pressure exceeds its normal operating range. The angle 138 of the tip 136 can be between 5 and 10 degrees, sufficient enough to protect the tip 137 of the optical fiber 124 up to maximum overpressure value.

Figure 14:
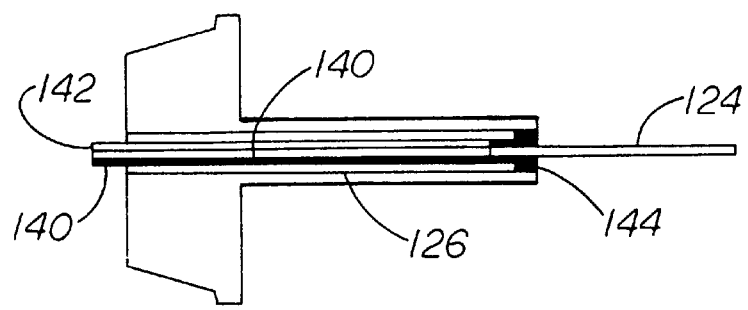

An alternative sensor housing/fiber ferrule design, wherein the optical fiber 124 is held in a separate inner tubular ferrule 140 inside the larger ferrule 126, is shown in FIG. 14. A section of the tip 142 of the ferrule 140 that holds the fiber is polished at an angle that can range from 80 to 85 degrees to the ferrule axis, with the rest of the tip of the ferrule polished perpendicularly to the ferrule axis to resemble the configuration of FIG. 13.

The ferrule 140 position with respect to the diaphragm 112 (not shown) is adjusted using a low cost and correctable brazing process as opposed to a laser welding technique. The use of a brazed joint 144 with the outer ferrule 126 allows for the ferrule's active positioning in respect to the diaphragm 112, and possible adjustment, when the ferrule 140 moves unpredictably due to the solder material solidification. This approach is different from the laser welding technique when unpredictable and uncorrectable movements of the ferrule 140 can force the fiber tip 142 to recede or to extend too far with respect to the diaphragm. One way of positioning the ferrule 140 is to contact it with the diaphragm center 116, then deflect the diaphragm 112 to a particular value of pressure (typically beyond its nominal pressure range) and then braze the inner ferrule 140 in place at its proximal end 144 to the larger ferrule 126.

In an alternative approach, the optical signal can be monitored during the brazing process to allow adjustment of the ferrule 140 position for a particular value of optical signal. If the ferrule is too close or too far in respect to the diaphragm 112, the detected signal is too high or too low. The brazed joint may be heated above its melting point and the ferrule 140 can be moved into a new position. Two to three iterations are found to result in the final fiber tip position within a few microns from fiber-to-diaphragm target position.

As shown schematically in FIGS. 15 and 16, two basic locations for the sensor 150 within a spark plug 152 are possible: (i) in the metal shell 154 as disclosed in my parent application, and (ii) as a part of the central electrode 156 of a spark plug 158 as disclosed here. The shell 152 location allows for placing the sensor 150 without disrupting the construction of the spark plug central electrode and its ceramic insert. However, the disadvantage of the off axis sensor location is that engine installation problems are created that tend to increase spark plug size and may cause spark fouling.

This version of the invention teaches a design where a metal diaphragm-based fiber optic pressure sensor is an integral part of the central electrode 156 of the spark plug 158. As shown in FIG. 16, the sensor 150 becomes the top element of the electrode 156.

Compared to a conventional spark plug electrode, the electrode 156 of the sensing spark plug 158 has a concentric hole 160 extending throughout its whole length to accommodate an optical fiber 162 extending from the top to the bottom of the electrode. Two possible ways of incorporating a fiber-holding element into the central electrode are disclosed here. In the approach shown in FIG. 17, a sensor body 157 is bonded into a counterbored cylindrical hole 159 formed in the top of the central electrode. Either high temperature brazing or electrical or laser welding at 155 can be used to fix the sensor body 157 to the electrode. The sensing diaphragm 164 is laser welded to the sensor body 157 at 163.

In an alternative design, shown in FIG. 18, fiber 162 is first brazed directly at 161 into the electrode 156, which then is capped with the sensing diaphragm 164. Laser welding at 167 is used to weld the diaphragm 164 to the electrode.

Another aspect of this invention deals with the concept of combining an optical in-line connector 166 and the high voltage spark plug connector 168 into a single part. As schematically shown in FIG. 19, one optical connector ferrule 166 is permanently bonded to the central electrode 156 and surrounded by metal electrical inner shell 170, both extending concentrically from the proximal surface of the electrode. Within the electrical shell 170 is the aligning split sleeve 172.

In a typical assembly procedure, the shell 170 can be brazed in place to electrode 156. The cylindrical metal element of the mating connector 168 is permanently bonded to the spark plug cable 165 comprising co-axial cable having an electrical cable surrounding the fiber optic cable. The mating connector 168 includes the other matching optical ferrule 166 and an interlocking shell with a latching feature. Several possible locking/latching designs are possible, derived from a variety of optical connectors presently used in telecommunication applications. A preferred design is based on a push-pull mechanism that does not require any rotational motions.

FIG. 20 illustrates a flame shield/quencher 174 integrated with the central electrode 156. The primary purpose of the shield 174 is to protect the diaphragm 164 from the direct effect of combustion flame. When the diaphragm 164 of a pressure sensor is exposed to a direct flame front, the diaphragm 164 is locally heated and this gives rise to increased deflection at the diaphragm center point. This increased deflection results in an erroneously high pressure reading. The shield 174, as schematically shown in FIG. 20, consists of a metal cup with a cylindrical hole 176 in its center. The size of the hole 176 is approximately 2 mm in length and 1.5 mm in diameter. Such a hole quenches flame without creating pressure distortions. The shield 174 is fixed by laser welding at 178 to the central electrode 156 after the sensor is installed in place.

Unlike the above versions of the sensor and spark plug wherein the sensor diaphragm is located adjacent or at the tip of the spark plug, the sensor mounting port is in the boss of the metal spark plug shell with a short passage to provide communication with the tip of the spark plug and combustion chamber of the cylinder in the versions disclosed below. This configuration has the benefits of low sensor head temperature and simplicity or sensor installation or replacement. In addition, only the metal shell of a spark plug is modified. Since the spark plug to which the sensor is attached is otherwise unmodified (standard ceramic cone, central electrode and side electrode materials and configuration), the sparking characteristics of the modified spark plug are unchanged from an unmodified spark plug of the same model.

The key feature of this configuration is an internal passage connecting the inside annular volume (surrounding the central electrode and exposed to cylinder combustion chamber pressure) to the sensor mounting chamber located in or adjacent the spark plug boss of the metal shell.

As shown in FIGS. 21 and 22 wherein a standard spark plug has been modified, the internal passage consists of three sections: a transverse hole 180 is formed in the spark plug metal shell 182, a channel 184 is formed in the external thread 186 of the spark plug and a cylindrical hole 188 is formed in the lower portion of the spark plug boss 190. Thus, the internal passage provides communication between the inside annular volume 192 and the sensor mounting chamber 194 formed in the boss 190. By using the channel 184 in the thread 186, the central electrode 194 need not be off-axis to provide space for an internal pressure passage. In FIG. 21 the sensor and cable are indicated by 196 and merely plug or thread into the sensor mounting chamber 194.

In an alternative version shown in FIGS. 23 and 24 the boss 190, and cylindrical hole 188' are modified to provide for an external separate sensor mounting chamber 194 in a holder 198 parallel to the spark plug axis 200. This configuration reduces the diameter of clearance volume required for the spark plug above the boss 190 which can be as low as 22 mm.

The dimensions of the three sections of the spark plug internal pressure passage are optimized to minimize any distortions in dynamic pressure readings. First, the length of the passage is approximately 8 mm from the top of the metal shell to the top of the boss. Such a length results in insignificant phase delays in a pressure response compared to a sensor located near the tip of the spark plug. Second, a relatively shallow channel 184 has a V-shape eliminating any potential Helmholtz resonance. Third, the cylindrical hole 188 is approximately 1.5 mm in diameter and 2 mm in length. Such dimensions are known to result in flame arrest without introducing any channel resonances. The length of the corresponding connecting hole 188' in FIGS. 23 and 24 is approximately 5 mm. Other sections of the passage have dimensions large enough to avoid significant resonance.

For the boss 190 mounted sensor of FIGS. 21 and 22, the sensor mounting chamber 194 has a cylindrical shape either with or without a thread, depending on the sensor style. For boss diameters of less than 24.5 mm, sensors with diameters ranging from 4 to 5 mm can be accommodated. The axis of the chamber 194 is slanted relative to the spark plug axis only the amount necessary for clearance to thereby minimize overall sensor-spark plug clearance diameter. In FIGS. 23 and 24 the holder 198 tube inner diameter is 2.5 mm and the boss 190 diameter is 22 mm.

The modifications to the metal shell 182 can be readily machined prior to spark plug assembly. Alternatively, the modifications can be machined in a completely assembled production spark plug so spark plugs of different manufacturers can be adapted to the pressure sensing needs. Spark plugs ranging from ones as small as M12 in diameter to 18 mm can be readily modified.

Different types of pressure sensors, including fiber optic, piezoelectric, piezoresistive, or even conventional strain gauges, can be mounted into the spark plug. With the internal pressure passage of FIGS. 21 and 22, the relatively low temperature of the sensor mounting chamber 194 (typically below 120° C.) enables installation of both piezoresistive and standard piezoelectric sensors (typically limited in their operating temperatures to 125–150° C.). If further temperature reduction is necessary, a sensor can be mounted above the boss as in the versions of FIGS. 23 and 24.

In FIGS. 25 and 26 an extension tube 202 is insertable in the boss 204 angular connecting hole 206. The extension tube 202 may be threaded in the connecting hole 206 and provides an angular extension from the axis of the spark plug at about 14° thereby permitting a spark plug as small as 20 mm to be modified for pressure sensing. The internal passage is otherwise similar to those above described including a channel 208 in the spark plug thread 210 and a transverse hole 212 communicating with the internal annular volume 214 of the plug. Thus, the version of FIGS. 25 and 26 also can provide for further temperature reduction at the sensor as with FIGS. 23 and 24.

FIG. 27 depicts a separate external ring 216 with a sensor mounting hole 218 intersecting a central hole 220 in the ring. In this embodiment the boss is removed from a standard spark plug to provide a diameter at 222 sized for an interference fit with the central hole 220. The central hole 220 is sized to provide sufficient clearance to pass over the thread 224 of the spark plug. In a manner similar to the embodiments above described an extension tube 226 is threaded or otherwise mounted in the mounting hole 218 to provide a means for mounting a pressure sensor at a distance from the spark plug tip sufficient to limit the temperature at the sensor location.

In FIGS. 28 and 29 the spark plug, in contrast to the above versions, has a channel 228 formed in the ceramic nose 230 surrounding the central electrode 232. The channel 228 communicates with the annular chamber 234 at the tip 236 of the spark plug and extends to an angular hole 238 which in turn communicates with the mounting hole 240 for the sensor. In this version the channel 228 is created in the ceramic nose 230 as a part of the manufacture of the spark plug before the spark plug is assembled. During assembly the channel 228 and the angular hole 238 are aligned for proper communication therebetween. This version avoids a passage that exposes the spark plug threads and interengaging threads to combustion gases which otherwise may create a potentially self-igniting area in some types of engines.

I claim:

1. In a fiber optic diaphragm sensor in combination with a spark plug, the spark plug having at least two electrodes, the sensor comprising a body, a diaphragm attached to the body and the body enclosing a cavity, the diaphragm being moveable in response to changes in fluid pressure exerted upon the diaphragm, and an optical fiber inserted in the body having a tip end of the optical fiber in communication with the cavity, the tip end being disposed to inject a light beam toward the diaphragm and to receive a light beam reflected from the diaphragm;

the sensor being positioned at the tip of one of the electrodes with the diaphragm directly exposable to the combustion gases within an engine cylinder.

2. The fiber optic diaphragm sensor according to claim 1 wherein the spark plug electrode has a cavity extending therethrough and the optical fiber is emplaced therein.

3. The fiber optic diaphragm sensor according to claim 2 wherein the cavity extending through the spark plug electrode is concentric with the optical fiber.

4. The fiber optic diaphragm sensor according to claim 2 wherein the cavity is centered in the electrode.

5. The fiber optic diaphragm sensor according to claim 1 wherein one of the at least two electrodes of the spark plug is a center electrode and the sensor is positioned on the center electrode.

6. The fiber optic diaphragm sensor according to claim 1 further comprising a shield covering the center electrode.

7. The fiber optic diaphragm sensor according to claim 6 wherein the shield has a cylindrical hole in the center.

8. The fiber optic diaphragm sensor according to claim 7 wherein the shield cylindrical hole extends approximately 2 mm in length and 1.5 mm in diameter.

9. The fiber optic diaphragm sensor according to claim 6 wherein the shield comprises metal.

10. A method for affixing a fiber optic diaphragm pressure sensor to a spark plug electrode, the fiber optic diaphragm pressure sensor comprising a ferrule and having a cavity therein, a diaphragm attached to the ferrule and partially enclosing the cavity, the diaphragm being movable in response to changes in fluid pressure exerted upon the diaphragm, the diaphragm comprising a top, an underside, a periphery, and a skirt depending from the top and terminating at the periphery, the skirt being thicker nearer the top than at the periphery, an optical fiber inserted in the ferrule having a tip end of the optical fiber in communication with the cavity, the tip end being disposed to inject a light beam toward the diaphragm and to receive a light beam reflected from the diaphragm underside, the center of the diaphragm being thicker than an annular portion about the center, the method comprising affixing the sensor into a cylindrical hole formed in the top of the electrode.

11. The method for affixing a fiber optic diaphragm sensor to a spark plug electrode according to claim 10 wherein the sensor is affixed by bonding.

12. The method for affixing a fiber optic diaphragm sensor to a spark plug electrode according to claim 10 wherein the sensor is affixed by high temperature brazing.

13. The method for affixing a fiber optic diaphragm sensor to a spark plug electrode according to claim 10 wherein the sensor is affixed by laser welding.

14. A method for mounting an optical fiber diaphragm pressure sensor to a spark plug electrode comprising the steps of:

brazing the optical fiber to the electrode, capping the electrode with the sensing diaphragm of the sensor, and welding the diaphragm to the electrode.

15. The method of mounting an optical fiber diaphragm sensor to a spark plug electrode according to claim 14 wherein the diaphragm is laser welded to the electrode.

16. The method for mounting an optical fiber diaphragm sensor according to claim 14 further comprising the step of:

affixing a quench shield to cover the center electrode and diaphragm.

17. In combination a unified part forming an optical fiber in-line connector and a high voltage spark plug electrode connector, the unified part comprising, an optical connector having a metal electrical inner shell and housing an aligning split sleeve, the inner shell permanently attachable to the spark plug electrode, and a mating connector permanently attached to a spark plug cable, the mating connector having an optical ferrule and an interlocking metal outer shell adapted to engage the inner shell, whereby engagement of the optical connector with the mating connector provides optical and electrical communication therebetween.

18. The unified part formed from an optical fiber in-line connector and a high voltage spark plug electrode connector according to claim 17 wherein the metal connecting shells of the connector permanently latch together.

19. In a combination of a spark plug having an external boss and at least two electrodes, an inside volume extending about one of the electrodes adjacent the electrode tip and a combustion pressure sensor, the improvement comprising a passage formed in the spark plug communicating with the inside volume, the passage extending into the boss and means in the boss to attach the combustion pressure sensor.

20. The combination of a spark plug and sensor of claim 19 wherein the passage is entirely formed in the metal portion of the spark plug.

21. The combination of a spark plug and sensor of claim 19 wherein the passage is at least partially formed in the ceramic portion of the spark plug.

22. The combination of a spark plug and sensor of claim 19 including an extension tube forming the means to attach the sensor to the boss.

23. The combination of a spark plug and sensor of claim 22 wherein the extension tube is parallel to the axis of the spark plug.

24. The combination of a spark plug and sensor of claim 22 wherein the extension tube is biased to the axis of the spark plug.

25. The combination of a spark plug and sensor of claim 19 wherein the boss comprises a sensing ring separately attached to the spark plug and the passage extending into the sensing ring.

26. The combination of a spark plug and sensor of claim 19 wherein at least a portion of the passage is V-shaped.

* * * * *